United States Patent [19]
Nagata et al.

[11] Patent Number: 5,343,279
[45] Date of Patent: Aug. 30, 1994

[54] LATERAL SHIFT PREVENTING MECHANISM FOR ENDLESS BELT

[75] Inventors: Tsunetoshi Nagata; Nobukazu Sasaki, both of Yokohama, Japan

[73] Assignee: Canon Kabushiki Kaisha, Tokyo, Japan

[21] Appl. No.: 900,323

[22] Filed: Jun. 18, 1992

[30] Foreign Application Priority Data

Jun. 20, 1991 [JP] Japan .................. 3-148648

[51] Int. Cl.⁵ ............................................. G03G 15/20
[52] U.S. Cl. ................................. 355/285; 198/806; 198/807; 219/216; 355/282
[58] Field of Search ............... 355/282, 285, 289, 290, 355/295, 212, 213, 281, 275, 300; 219/216; 198/806, 807, 810; 474/102–108; 250/548, 561, 571

[56] References Cited

U.S. PATENT DOCUMENTS

| | | | |
|---|---|---|---|
| 2,451,394 | 10/1948 | Klein | 198/806 |
| 2,511,194 | 6/1950 | Blaber | 198/806 |
| 3,159,268 | 12/1964 | Dyke | 198/807 |
| 3,368,665 | 2/1968 | Jinkins | 198/806 |
| 3,540,571 | 11/1970 | Morse et al. | 198/806 |
| 3,545,599 | 12/1970 | Smith et al. | 198/807 |
| 3,687,273 | 8/1972 | Macone et al. | 198/806 |
| 3,715,027 | 2/1973 | Fujimoto | 198/806 |
| 3,973,446 | 8/1976 | Vasilantone | 198/806 X |
| 4,173,904 | 11/1979 | Repetto | 198/807 X |
| 4,286,706 | 9/1981 | Castelli et al. | 198/806 |
| 4,429,985 | 2/1984 | Yokota | 355/212 |
| 4,527,686 | 7/1985 | Satoh | 198/807 |
| 5,091,752 | 2/1992 | Okada | 355/285 |
| 5,119,143 | 6/1992 | Shimura | 219/216 X |
| 5,157,444 | 10/1992 | Mori et al. | 198/806 X |

FOREIGN PATENT DOCUMENTS

| | | |
|---|---|---|
| 0390090 | 10/1090 | European Pat. Off. . |
| 0295901 | 12/1988 | European Pat. Off. . |
| 0372558 | 6/1990 | European Pat. Off. . |
| 0443799 | 8/1991 | European Pat. Off. . |
| 0446946 | 9/1991 | European Pat. Off. . |
| 2285380 | 11/1990 | Japan . |
| 325477 | 2/1991 | Japan . |
| 0659448 | 1/1987 | Switzerland ........ 198/807 |
| 0773500 | 4/1957 | United Kingdom ...... 198/806 |
| 0834014 | 5/1960 | United Kingdom ...... 198/807 |

OTHER PUBLICATIONS

Patent Abstracts of Japan, Kokai No. 03-025477, vol. 15, No. 156, Apr. 1991.

*Primary Examiner*—A. T. Grimley
*Assistant Examiner*—William J. Royer
*Attorney, Agent, or Firm*—Fitzpatrick, Cella, Harper & Scinto

[57] ABSTRACT

A lateral shift preventing mechanism for a rotatable endless belt includes a tension member for applying a tension to the endless belt; a receiving member for receiving lateral shifting force from the endless belt; and a displacing mechanism for converting a moving force to the receiving member to a displacing force to the tension member to displace the tension member.

6 Claims, 8 Drawing Sheets

LATERAL SHIFT PREVENTING MECHANISM FOR ENDLESS BELT

FIELD OF THE INVENTION AND RELATED ART

The present invention relates to a lateral shift preventing mechanism for an endless belt, and more particularly to such a mechanism for an endless belt of a heat fixing apparatus.

In a widely used heat fixing apparatus, a heat roller is used. However, EP0295901A2, EP0390090A2 and Japanese Laid-Open Patent Application No. 285380/1990 have proposed a heat fixing apparatus using a thin film in the form of an endless belt.

When such an endless belt is used, a problem of lateral shift of the belt arises.

Japanese Laid-Open Patent Application No. 25477/1991 proposes that a rib is mounted at a lateral end of the film, and the rib is confined to prevent the lateral shift of the film.

However, where the lateral shift of a thin film is prevented by confining movement of the lateral edge of the film, the film may be creased if the lateral shifting force of the film is strong.

In addition, when the film is provided with the rib, the stress is concentrated on a part of the rib with the result being the tearing, damage or peeling of the rib. In addition, the rib may be disengaged with the confining member.

SUMMARY OF THE INVENTION

Accordingly, it is a principal object of the present invention to provide a lateral shift preventing mechanism for an endless belt in which the damage to the film due to the lateral shifting force of the endless belt is prevented.

It is another object of the present invention to provide a lateral shift preventing mechanism for an endless belt in which the lateral shifting force of the endless belt can be automatically reduced.

According to an aspect of the present invention, there is provided a lateral shift preventing mechanism for a rotatable endless belt, comprising: a tension member for applying tension to the endless belt; a receiving member for receiving lateral shifting force from the endless belt; and displacing means for converting a moving force to said receiving member to a displacing force to said tension member to displace said tension member.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
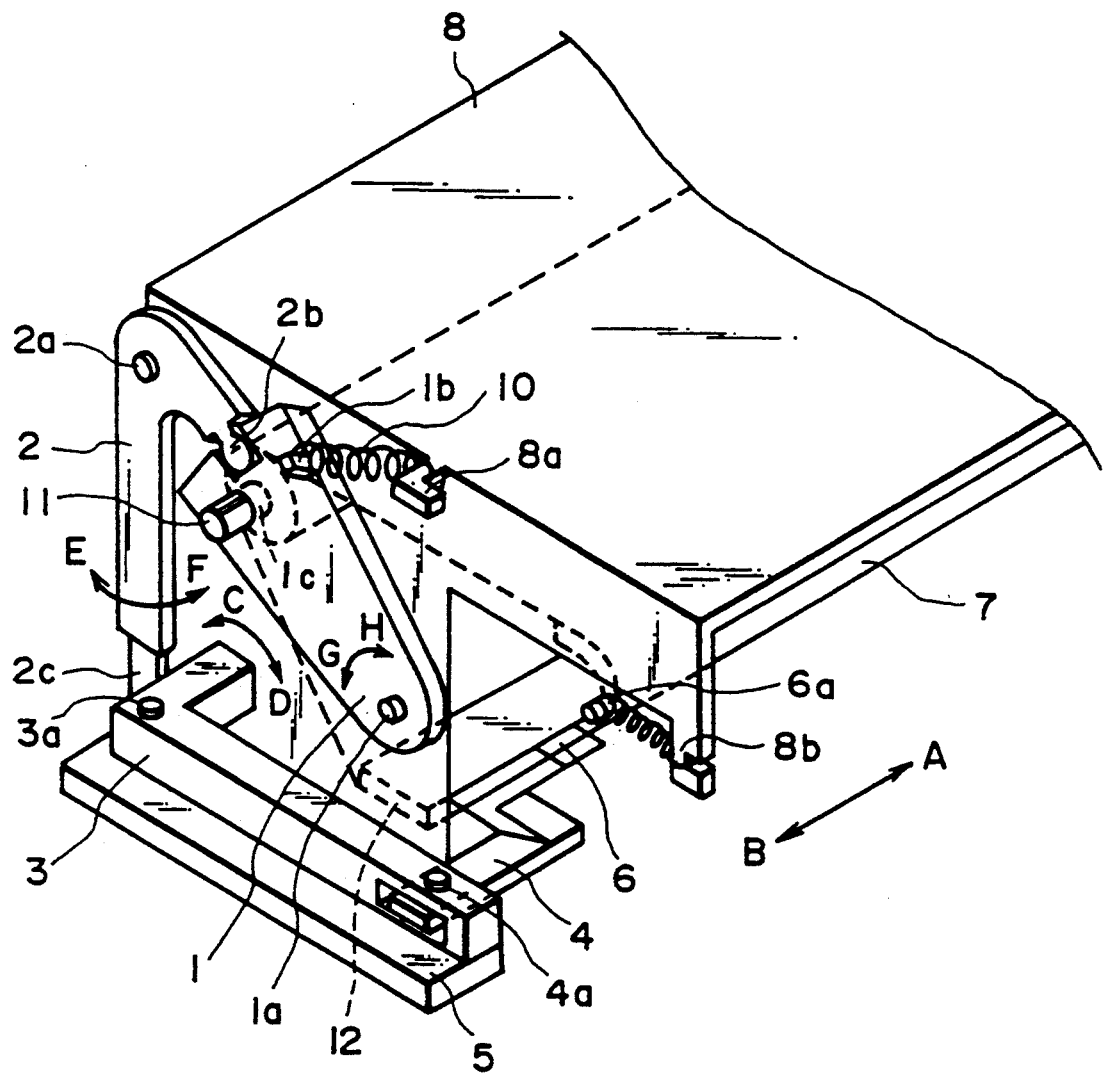
FIG. 1 is a perspective view of an image fixing apparatus using an embodiment of the present invention.

FIG. 1 is a perspective view of an image fixing apparatus using a lateral shift preventing mechanism for an endless belt according to a first embodiment of the present invention.

It comprises a first arm 1 which is rotatable about a shaft 1a and which is provided with a spring engaging portion 1b, a second arm 2 which is rotatable about a shaft 2a and which is engaged with the first arm 1 by the circular portion 2b and a third arm 3 which is rotatable about a shaft 3a on a wall 5 and which is contacted to a rod portion 2c. It further comprises a confining member 4 rotatable about a pin 4a mounted on the third arm 3 and a tension plate 6 which is so urged as to apply a tension force to the film by the spring force of the tension spring 9.

FIG. 1 shows only the front side of the fixing apparatus, but the tension plate 6 is urged by the tension spring 9 also at the rear side.

A plate 8 is provided with integral spring hooks 8a and 8b. A tension spring 10 is stretched between the spring hook 8a of the plate 8 and a spring engaging portion 1b of the first arm 1. The tension spring 10 functions to urge the first arm 1 in a direction H to provide the fixing film 7 with a rearward (direction A) shifting tendency.

More particularly, under the condition that the confining member 4 does not receive the lateral shifting force of the film, the driving roller 11 applying the tension to the film is urged in the direction H only at the front side, so that the driving roller is slightly displaced in the direction H at the front side, by which the lateral shifting force of the fixing film 7 is normally limited toward the rear side.

The spring 10 has enough spring force to prevent the front side of the driving roller from falling by the reaction force produced when the driving roller 11 is rotated. The fixing film 7 comprises a film having a thickness of approx. 20 microns and made of heat resistive resin material such as PI (polyimide), PEI (polyether imide) or PES (polyether sulfone) with a parting layer thereon having a thickness of approx. 10 microns made of fluorinated resin such as PTFE (polytetrafluoroethylene). The total thickness of the film is preferably not more than 100 microns, and further preferably not more than 50 microns.

The driving roller 11 is engaged with a hole 1c of the first arm 1. In the Figure, double-headed arrows C-H indicate movable directions of the arms.

Figure 2:
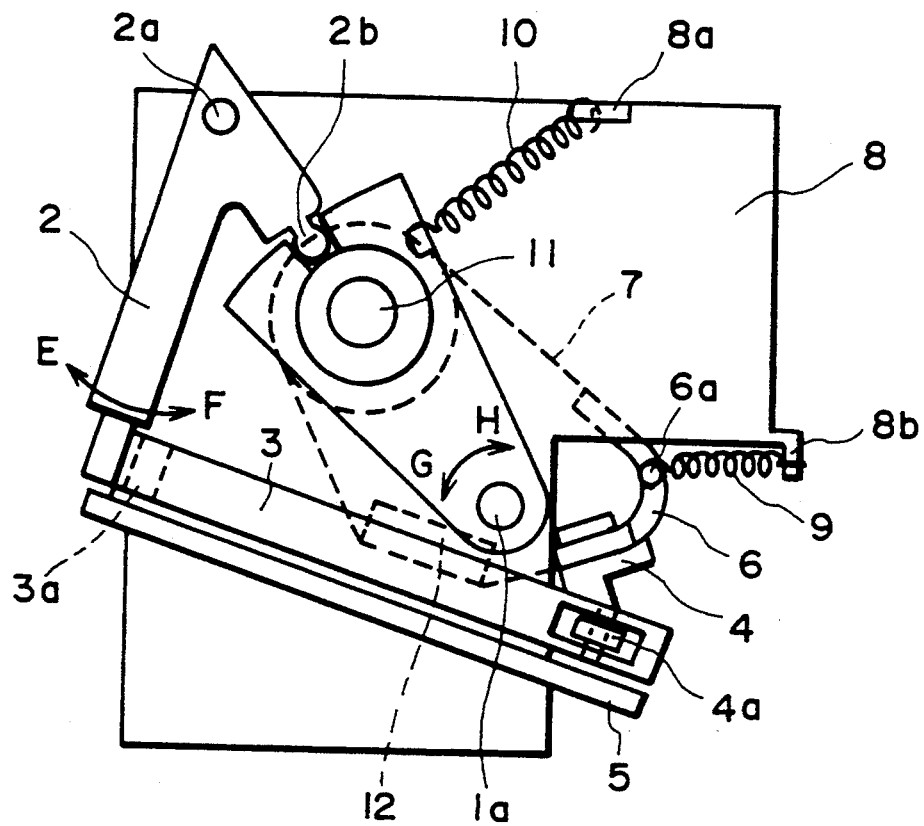
FIG. 2 is a front view of the apparatus of FIG. 1.
Figure 3:
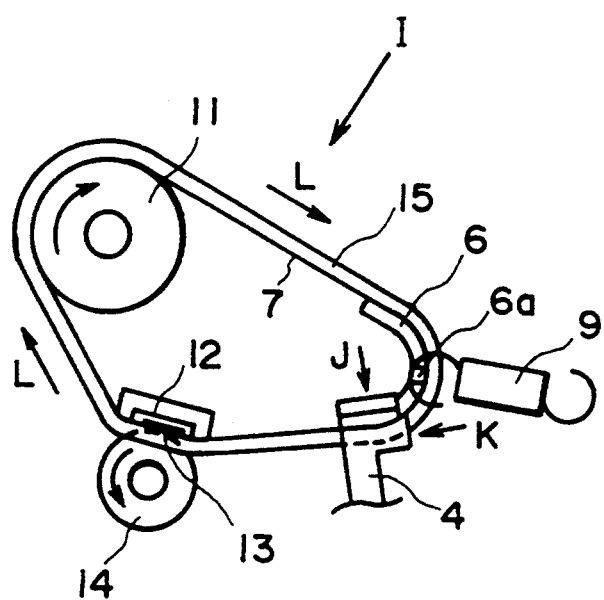
FIG. 3 is an inside front view of the apparatus of FIG. 1.

FIG. 2 is a front view of an apparatus of FIG. 1, and FIG. 3 is a front view of an inside of the apparatus without the plate 8. The fixing film 7 is provided with a rib 15 on the outer periphery thereof only at a front side thereof. The rib 15 in this embodiment has been integrally formed with the heat resistive resin of the fixing film 7. As an alternative, the rib 15 may be bonded to the fixing film by bonding agent or the like, and in such a case, the rib 15 may be made of the material having good sliding property.

The fixing film 7 is extended around the driving roller 11, the tension plate 6 urged by the tension spring 9 and a heater 13. The heater 13 is supported on a heater holder 12. A pressing or backup roller 14 is pressed to the heater 13 with the fixing film 7 therebetween with a pressure sufficient to permit the image fixing operation. The driving roller 11 is rotated in the direction indicated by the arrow, so that the fixing film 7 is moved in the direction L.

The description will be made as to the engagement between the rib 15 and the confining member 4 which receives the lateral shifting force from the film 7.

Figure 4:
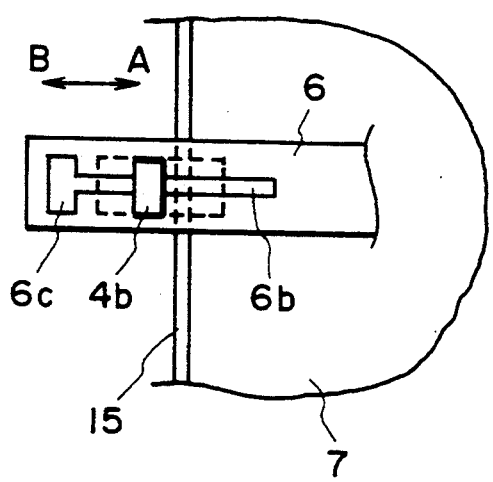
FIG. 4 is a view as seen in direction J.

FIG. 4 is a view as seen in a direction J in FIG. 3. The tension plate 6 is provided with holes 6b and 6c. The hole functions as a guide for movably guiding a portion 4b of the confining member 4 in the directions A and B. The hole 6c has a large size for receiving the portion 4b.

Figure 5:
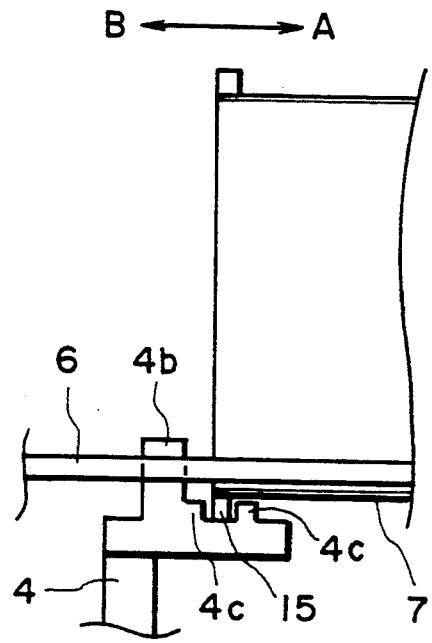
FIG. 5 is a view as seen in direction K.

FIG. 5 is a view as seen in a direction K of FIG. 3. The rib 15 is positioned between two projections 4c of the confining member 4. Therefore, when the fixing film 7 is shifted in the direction A or B, the confining member 4 receives the lateral shifting force from the rib, so that the confining member 4 is moved.

Figure 6:
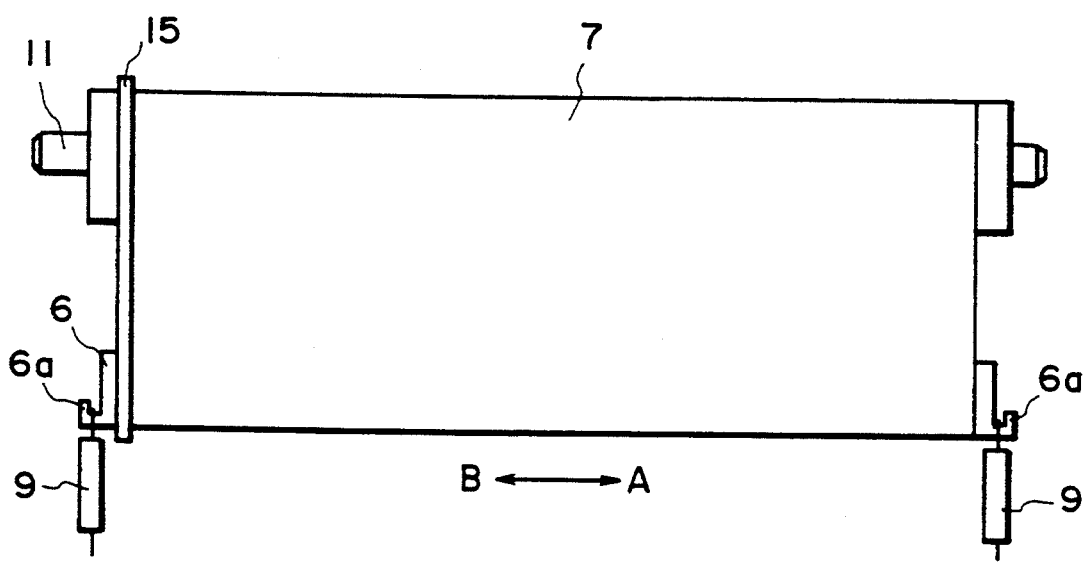
FIG. 6 is a view as seen in direction I.

FIG. 6 is a view as seen in the direction I of FIG. 3. As shown in this Figure, the rib 15 is provided only at the front (left) side of the fixing film 7 in this embodiment. The hook 6a of the tension plate 6 is engaged with the tension spring 9 to apply the tension force to the fixing film 7.

In this embodiment, the spring force of the spring 10 and the force applied to the rib 15 of the fixing film 7 are balanced when the apparatus is at rest, the spring 10 applies to the driving roller 11 the upward force to support it and to provide it with the lateral shifting tendency.

The force applied to the rib 15 within the movable range of the confining member 4, is substantially constant except for the slight change of the urging force of the tension spring 10 due to the position change of the driving roller.

The lateral shift preventing function in this embodiment will be described. In the fixing operation, the heater generates the heat, and the fixing film starts to rotate. It is assumed that in FIG. 1, the fixing film starts to shift toward the rear (direction A). Since the confining member 4 is engaged with the fixing film 7, it is moved by the fixing film 7 in the direction A. Then, the third arm 3 engaged with the confining member 4 rotates in the direction C about the shaft 3a. This urges the circular portion 2c of the second arm 2 in the direction E. Since the rod portion 2c of the arm 2 is in engagement with the first arm, the first arm 1 rotates in the direction G.

Then, the front side (B side) of the driving roller is urged downwardly against the spring force of the tension spring 10. As a result, the lateral shifting tendency of the fixing film 7 in the direction A decreases. In this manner, the rearward (direction A) shifting tendency of the fixing film 7 may be removed.

When the fixing film 7 starts to shift toward the front (direction B), the confining member 4 is moved in the direction B, and therefore, the third arm 3 rotates in the direction D. By this movement of the third arm 3 confining the position of the second arm 2, the arm 2 is released. By this, the first arm 1 is permitted to move in the direction H by the tension spring 10. Thus, the driving roller 11 moves upwardly, by which the fixing film 7 starts to shift toward the rear (direction A), and therefore, the frontward shifting tendency can be removed.

As described in the foregoing, according to the present invention, the force received by the movable confining member from the fixing film in the form of an endless belt, is converted to the driving roller applying the tension to the fixing film by the arms 1, 2 and 3, and the lateral shifting force is automatically applied in the direction opposite from the lateral shifting tendency of the endless belt.

Therefore, the load to the fixing film and/or the rib is significantly reduced to stabilize fixing film movement substantially without crease of the film, damage, tearing or the like of the rib or the lateral shifting of the film.

Figure 7:
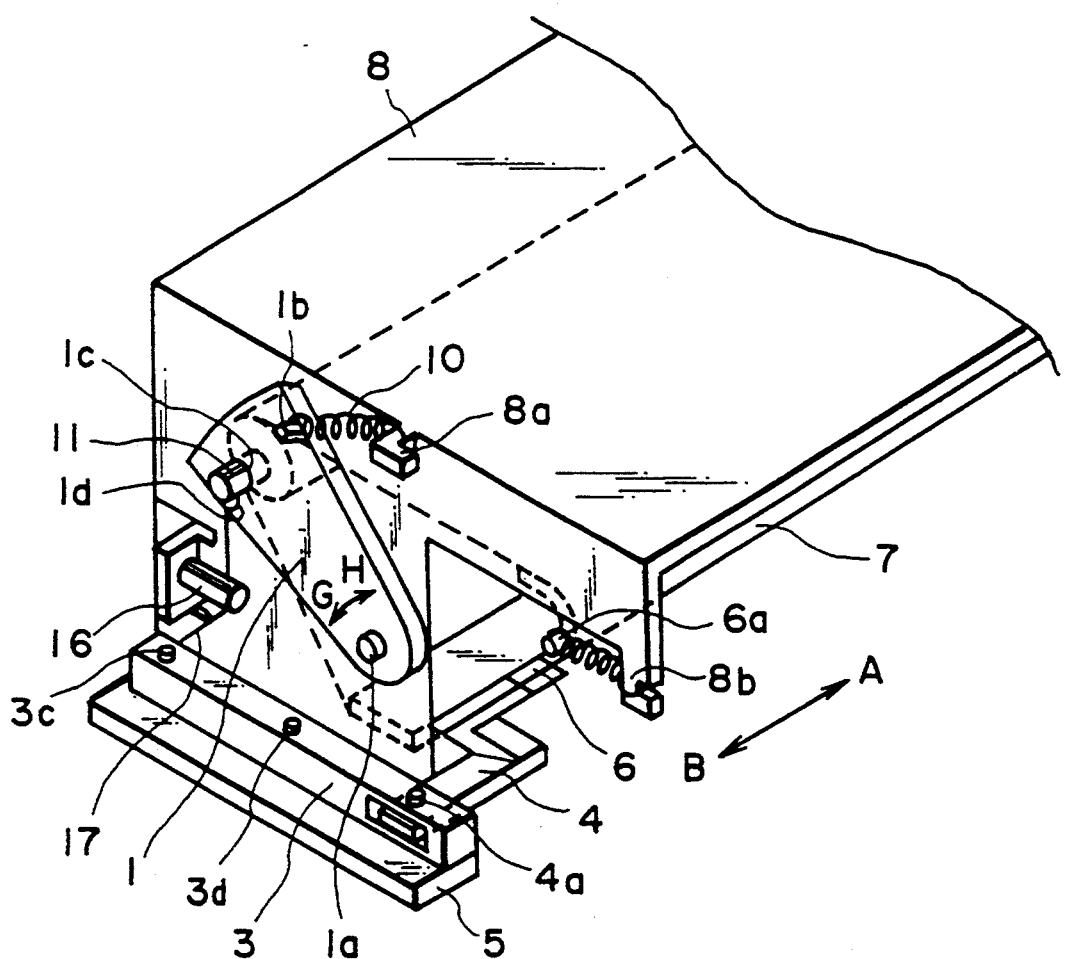
FIG. 7 is a perspective view of an apparatus according to another embodiment of the present invention.

FIG. 7 shows an apparatus of another embodiment. In this embodiment a roller 16 is used in place of the second arm 2 of the first embodiment, and a hole 1d of a first arm 1 and a hole 3c of a third arm 3 are connected by a wire 17 by way of the roller 16. The arm 3 is rotatable about a shaft 3d. The movements of the fixing film 7 and the driving roller 11 are similar to those in the first embodiment. When the fixing film 7 is shifted in the direction A, the driving roller 11 is moved in the direction G, where as when the fixing film 7 is shifted in the direction B, the driving roller 11 is moved in the direction H.

Figure 8:
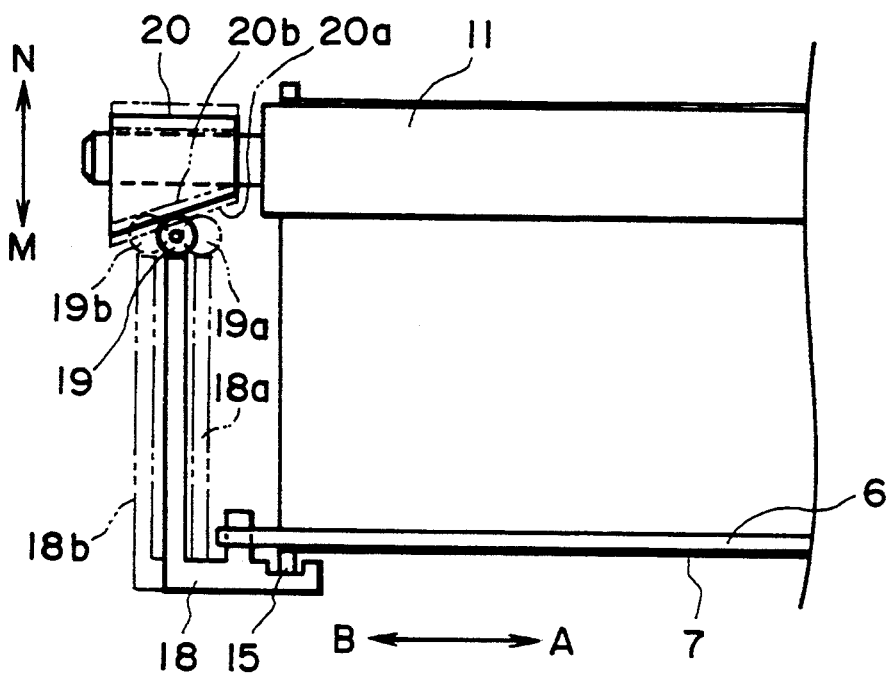
FIG. 8 is a sectional view of an apparatus according to a further embodiment of the present invention.

FIG. 8 shows an apparatus of a further embodiment. In this embodiment, a confining member 18 engaged with the rib 15 of the fixing film 7 is guided by the tension plate 6 so as to be movable in the directions A and B in accordance with the lateral shifting tendency of the film.

To an end of the confining member 18, a roller 19 is mounted and is normally contacted to a bearing 20 for the driving roller 11, the bearing 20 being provided with a tapered portion.

The description will be made as to the motion of the confining member 18. When the fixing film starts to shift in the direction A, the confining member 18 in engagement with the rib 15 of the fixing film 7 is moved also in the direction A, so that the confining member 18 of FIG. 8 is moved to a position 18a. At this time, the roller 19 is moved together to a position 19a, so that the bearing 20 lowers in a direction M to a position 20a. Thus, the driving roller 11 is lowered in the direction M, so that the fixing film 7 is now provided with the opposite shifting tendency (direction B). When, on the contrary, the fixing film 7 is laterally shifted in the direction B, the confining member 18 and the roller 19 are moved to positions 18b and 19b, respectively, and therefore, the bearing 20 is moved up to a position 20b. Therefore, the driving roller 11 is moved up in a direction N. This is effective to shift the fixing film 7 back in the direction A.

Figure 9:
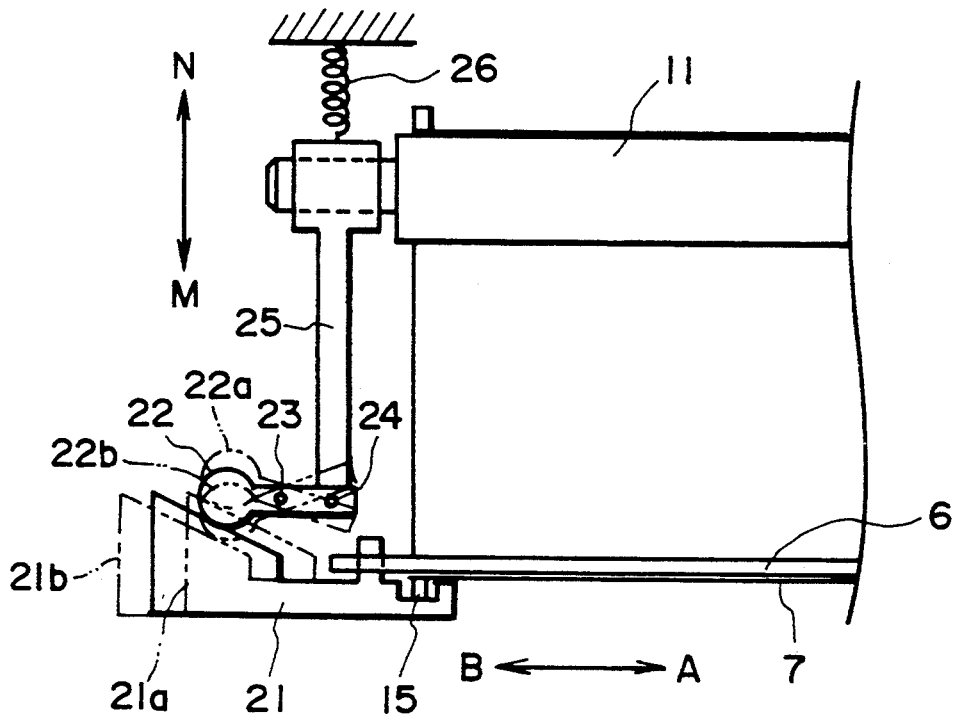
FIG. 9 is a sectional view of an apparatus according to a further embodiment of the present invention.

FIG. 9 shows an apparatus according to a further embodiment of the present invention. In this embodiment, one (circular portion) of arms 22 rotatable about a shaft 23 is contacted to a confining member 21, and the other is coupled with a bearing 25 by a shaft 24. The bearing 25 supports the driving roller and is normally urged in the direction N by a tension spring 26.

The operation will be described. When the fixing film 7 starts to shift in the direction A, the confining member 21 in engagement with the rib 15 of the fixing film 7 moves in the direction A to a position 21a. Then, the arm 22 is urged upwardly along the tapered surface of the confining member 21 to a position 22a, and therefore, the bearing 25 is moved down in the direction M. Therefore, the driving roller 11 is also lowered in the direction M. In this manner, the fixing film 7 is laterally shifted back in the direction B.

When, on the contrary, the fixing film 7 is laterally shifted in the direction B, the confining member 21 and the arm 22 are moved to positions 21b and 22b, respectively, and therefore, the bearing 25 is moved up in the direction N. Therefore, the driving roller 11 is also moved up in the direction N. Then, the fixing film 7 may be shifted back in the direction A.

Figure 10:
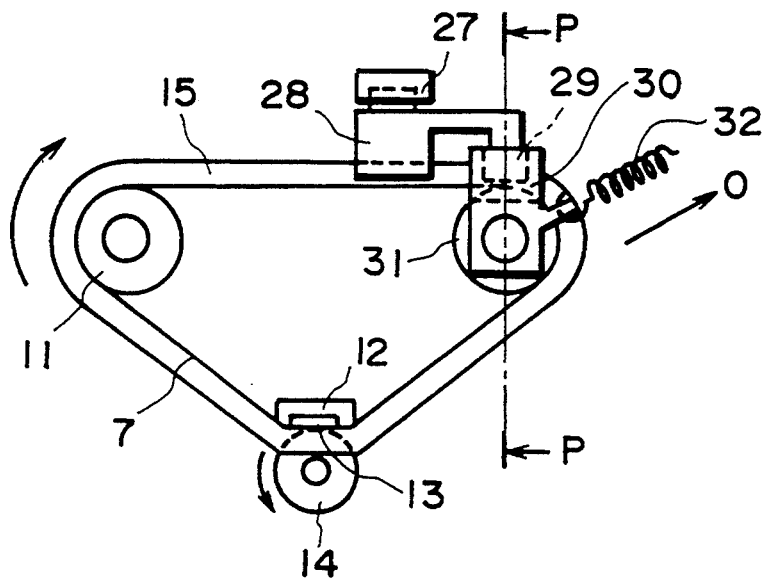
FIG. 10 is a front view of an apparatus according to a further embodiment of the present invention.

FIG. 10 shows an apparatus according to a further embodiment of the present invention. In this embodiment, the fixing film 7 is supported by the driving roller 11, the heater and a tension roller 31, and the lateral shift of the fixing film is controlled not by displacing the driving roller 11 but by displacing the tension roller 31. In FIG. 10, the apparatus comprises a confining member 28, a guiding plate for guiding the confining member 27, a roller 29, a bearing 30 having a tapered surface and a tension spring 32 for normally urging the tension roller 31 in a direction O.

Figure 11:
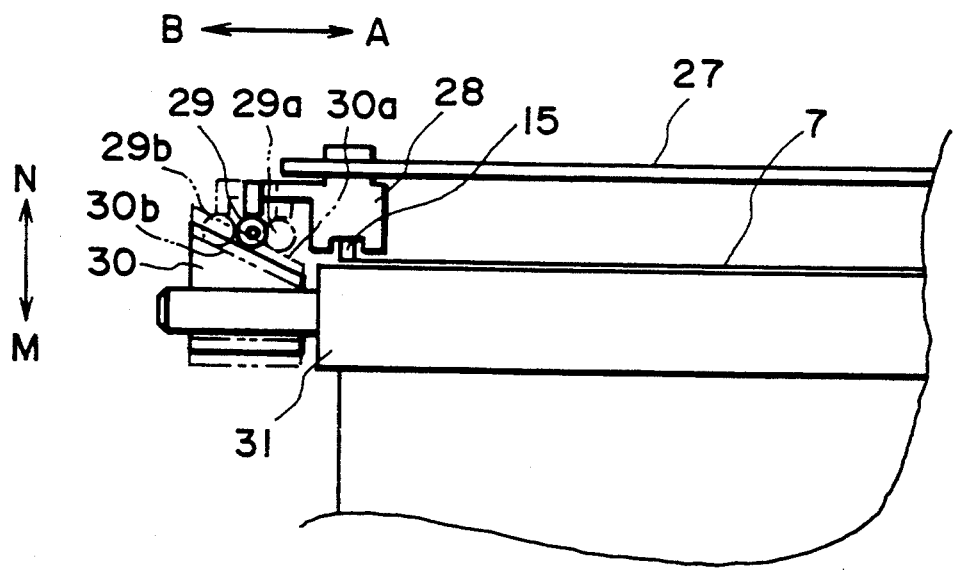
FIG. 11 is a sectional view taken along a line P—P in FIG. 10.

FIG. 11 is a sectional view taken along a line P—P of FIG. 10. In FIG. 11, when the fixing film 7 starts to shift laterally in the direction A, the confining member 28 in engagement with the rib 15 is also moved in the direction A. This moves the confining member 28 so that the end roller 29 is moved to a position 29a, and therefore, the bearing 30 is moved to a position 30a by the urging force of the tension spring 32, and therefore, the tension roller 31 is displaced in the direction N. Then, it is brought into a twisted position relative to the driving roller 11, and therefore, the fixing film 7 starts to shift in the direction B to compensate for the lateral shift in the direction A. In this manner, the travel of the fixing film 7 is stabilized.

When, on the contrary, the fixing film starts to shift in the direction B, the opposite operation occurs. More particularly, when the fixing film 7 starts to move in the direction B, the roller 29 comes to a position 29b to lower the bearing 30 to a position 30b, and therefore, the driving roller 11 is displaced in the direction M. Because of this, the fixing film 7 starts to shift in the direction A to compensate for the B direction shift. Therefore, the travel of the fixing film 7 is stabilized.

In the foregoing embodiment, the tension member for applying the tension to the fixing film is displaced substantially in the vertical direction.

Figure 12:
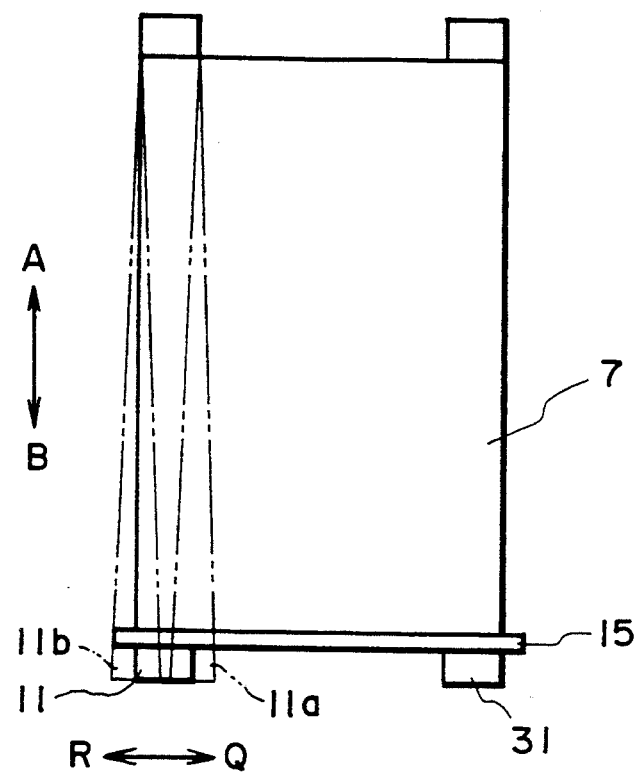
FIG. 12 is a plan view illustrating an operational principle in an apparatus according to a further embodiment of the present invention.

FIG. 12 shows an apparatus according to a further embodiment wherein the tension member is displaced substantially in horizontal directions. The fixing film 7 is extended around the driving roller 11 and the tension roller 31.

Figure 13:
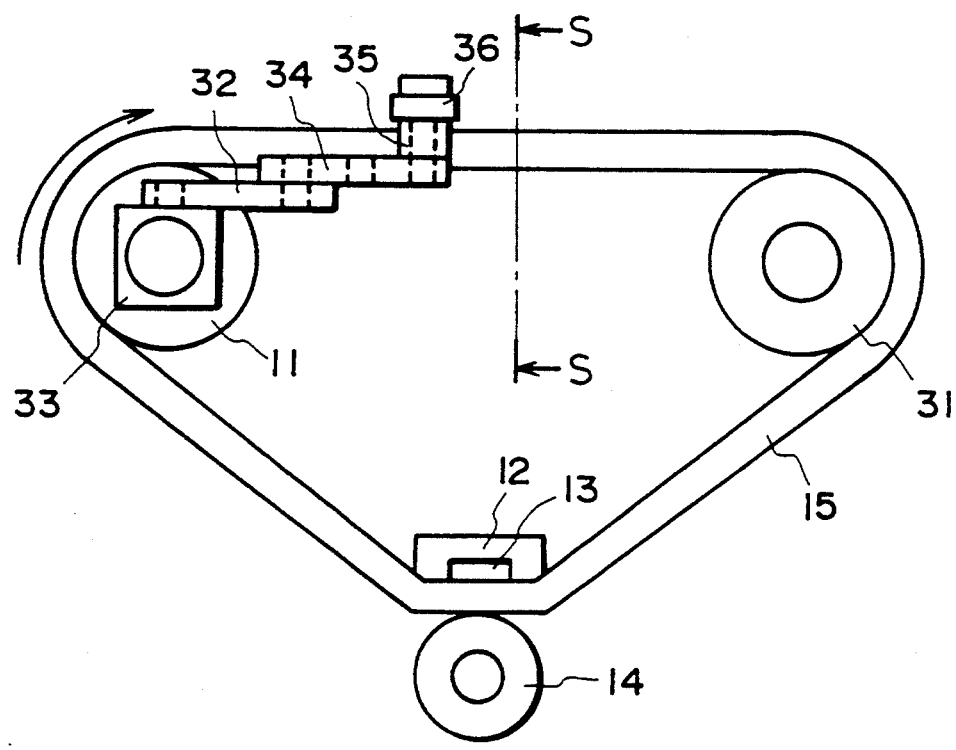
FIG. 13 is a front view of an apparatus according to a further embodiment of the present invention.

When the driving roller 11 is moved in a direction Q (a position 11a), the fixing film 7 starts to shift in the direction B. When, on the contrary, the driving roller 11 is moved in a direction R (position 11b), the fixing film 7 starts to shift in the direction A. This movement principle is used in this embodiment. In FIG. 13, to the bearing 33 of the driving roller 11, a lever 32, a lever 34 and a confining member 35 are coupled in this order.

Figure 14:
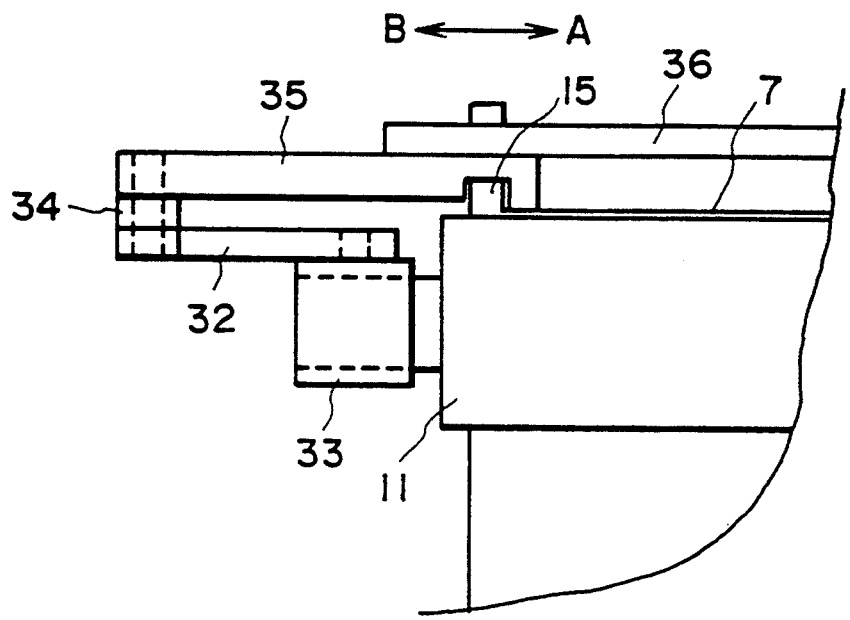
FIG. 14 is a sectional view taken along a line S—S in FIG. 13.

FIG. 14 is a sectional view taken along a line S—S. In FIG. 14, the confining member 35 is in engagement with the rib 15, and is also in engagement with a confining member guiding plate 36. The confining member 35 is movable in directions A and B.

Figure 15:
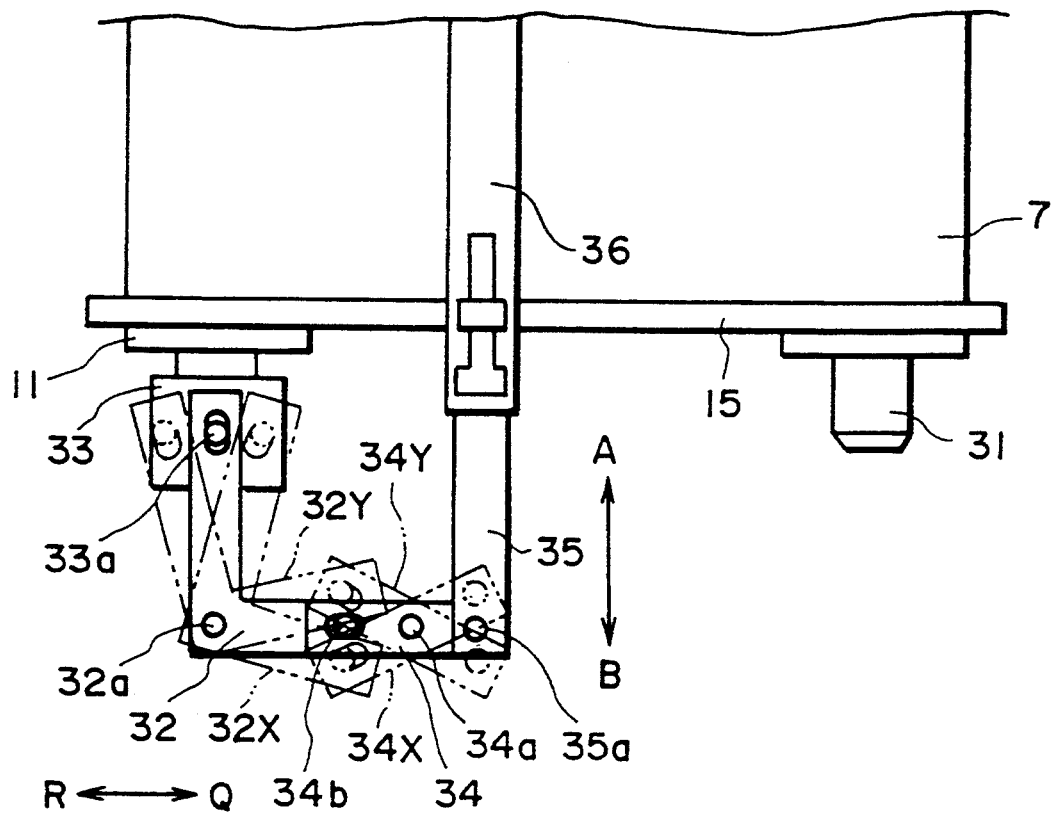
FIG. 15 is a plan view of an apparatus according to a further embodiment of the present invention.

Referring to FIG. 15, the operation of the apparatus of this embodiment will be described. The lever 32 is rotatable about a fixed shaft 32a. The lever 32 is connected with the bearing 33 by a shaft 33a and is connected with a lever 34 by a shaft 34b. The lever 34 is rotatable about a fixed shaft 34a and is connected with the confining member 35 by a shaft 35a.

When the fixing film 7 starts to laterally shift in the direction A, the confining member 35 follows it. Therefore, the lever 34 is displaced to a chain line position 34x, and the lever 32 is displaced to a chain line position 32x. Therefore, the bearing 33 coupled with the lever 32, and therefore, the driving roller 11 is moved in the direction Q, so that the fixing film starts to shift back in the direction B, as in FIG. 12. In this manner, the lateral shift of the fixing film 7 in the direction A can be cancelled, whereby the movement of the fixing film 7 is stabilized.

When, on the contrary, the fixing film 7 starts to shift in the direction B, the lever 34 is displaced to a chain line position 34Y, and the lever 32 is displaced to a chain line position 32Y. Therefore, the bearing 33 coupled with the lever 32, and therefore, the driving roller 11 is moved in the direction R. Thus, the fixing film 7 starts to laterally shift in the direction A to cancel the lateral shift of the fixing film 7 in the direction B, whereby the movement of the fixing film 7 is stabilized.

As described in the foregoing, according to the present invention, the lateral shifting force of the endless belt and the load thereto can be significantly reduced to accomplish the stabilized travel of the endless belt without crease or damage.

While the invention has been described with reference to the structures disclosed herein, it is not confined to the details set forth and this application is intended to cover such modifications or changes as may come within the purposes of the improvements or the scope of the following claims.

What is claimed is:

1. A lateral shift preventing mechanism, comprising:
   a rotatable endless belt having a thickness of not more than 100 microns and provided with a rib at its lateral position;
   a tension member for applying a tension to the endless belt;
   a receiving member for receiving lateral shifting force from the endless belt, said receiving member contactable with the rib; and
   displacing means for converting a moving force to said receiving member to a displacing force to said tension member to displace said tension member.

2. A mechanism according to claim 1, wherein said mechanism is incorporated in a heat fixing apparatus and wherein a heater is provided inside a loop formed by the endless belt, and the endless belt is moved together with an in contact with an image bearing member.

3. A mechanism according to claim 1, wherein said tension member includes a driving roller for driving the endless belt.

4. An image fixing apparatus comprising:

an endless belt having a thickness of not more than 100 microns and provided with a rib at its lateral position;

a heater for heating an unfixed image through said endless belt;

a tension member for applying a tension to the endless belt;

a receiving member for receiving lateral shifting force from the endless belt, said receiving member contactable with the rib; and displacing means for converting a moving force to said tension member to displace said tension member.

5. An apparatus according to claim 4, further comprising a back-up member cooperative with said heater to form a nip with said belt interposed therebetween.

6. An apparatus according to claim 4, wherein said tension member includes a driving roller for driving the endless belt.

* * * * *

UNITED STATES PATENT AND TRADEMARK OFFICE
CERTIFICATE OF CORRECTION

PATENT NO. : 5,343,279
DATED : August 30, 1994
INVENTOR(S) : TSUNETOSHI NAGATA, ET AL.

It is certified that error appears in the above-indentified patent and that said Letters Patent is hereby corrected as shown below:

ON THE TITLE PAGE, UNDER FOREIGN PATENT DOCUMENTS:

"0390090 10/1090 Euro. Pat. Off." should read --0390090 10/1990 Euro. Pat. Off.--; and
"2285380 11/1990 Japan 325477 2/1991 Japan" should read --2-285380 11/1990 Japan 3-25477 2/1991 Japan--.

Column 6,
  Line 64, "an" (second occurrence) should read --and--.

Signed and Sealed this

Twenty-seventh Day of December, 1994

Attest:

BRUCE LEHMAN

Attesting Officer  Commissioner of Patents and Trademarks